US012560308B2

(12) United States Patent
Yu

(10) Patent No.: US 12,560,308 B2
(45) Date of Patent: Feb. 24, 2026

(54) LIGHT ASSEMBLY USING A LIGHT EMITTING DIODE

(71) Applicant: LEDup Manufacturing Group Limited, Irwindale, CA (US)

(72) Inventor: Jing Jing Yu, Irwindale, CA (US)

(73) Assignee: Ledup Manufacturing Group Limited, Irwindale, CA (US)

( * ) Notice: Subject to any disclaimer, the term of this patent is extended or adjusted under 35 U.S.C. 154(b) by 0 days.

(21) Appl. No.: 18/944,487

(22) Filed: Nov. 12, 2024

(65) Prior Publication Data

US 2025/0164097 A1 May 22, 2025

Related U.S. Application Data

(60) Provisional application No. 63/548,039, filed on Nov. 10, 2023.

(51) Int. Cl.

| | |
|---|---|
| ***F21V 17/10*** | (2006.01) |
| ***F21V 3/02*** | (2006.01) |
| ***F21V 3/04*** | (2018.01) |
| ***F21V 23/00*** | (2015.01) |
| ***F21V 31/00*** | (2006.01) |
| ***F21W 121/04*** | (2006.01) |
| ***F21Y 115/10*** | (2016.01) |

(52) U.S. Cl.
CPC ................ *F21V 17/10* (2013.01); *F21V 3/02* (2013.01); *F21V 3/049* (2013.01); *F21V 23/001* (2013.01); *F21V 31/005* (2013.01); *F21W 2121/04* (2013.01); *F21Y 2115/10* (2016.08)

(58) Field of Classification Search
CPC . F21V 17/10; F21V 3/02; F21V 3/049; F21V 23/001; F21V 31/005; F21W 2121/04; F21Y 2115/10
See application file for complete search history.

(56) References Cited

U.S. PATENT DOCUMENTS 4,791,335 A * 12/1988 Lin .......................... H01K 1/46 313/318.09
5,667,295 A * 9/1997 Tsui .......................... F21S 4/15 362/267
5,820,419 A * 10/1998 Liao ....................... H01R 33/09 439/280
6,368,161 B1 * 4/2002 Lin ........................ H01R 33/18 439/619
8,376,606 B2 * 2/2013 Yu ......................... F21V 31/005 362/652

(Continued)

*Primary Examiner* — Tsion Tumebo
(74) *Attorney, Agent, or Firm* — William W. Cochran; Cochran Freund & Young LLC

(57) ABSTRACT

Disclosed is a light assembly that has an integral bulb shell and lamp assembly extension that are formed from a single structure. A separate LED assembly can be inserted into an opening in the lamp assembly extension and held in place by a heat shrinkable sleeve and a locking structure in the lamp assembly extension. The lamp assembly is less expensive and easier to assemble than lamp assemblies using multiple parts. The lamp assemblies can be easily constructed by simply inserting the LED assemblies into the light assembly. The light string can use serial connections by forming LED assemblies on a single strand of an insulated conductor and simply inserting LED assemblies in the light assemblies.

10 Claims, 6 Drawing Sheets

(56) References Cited

U.S. PATENT DOCUMENTS

| | | | | |
|---|---|---|---|---|
| 8,746,953 | B1 * | 6/2014 | Shao | F21V 17/06 362/651 |
| 2008/0143234 | A1 * | 6/2008 | Yu | F21V 17/06 313/318.09 |
| 2015/0211726 | A1 * | 7/2015 | Wu Lee | F21K 9/20 362/645 |
| 2017/0336063 | A1 * | 11/2017 | Leung | F21V 3/00 |
| 2021/0140623 | A1 * | 5/2021 | Yu | F21S 4/10 |
| 2022/0403989 | A1 * | 12/2022 | Leung | H01R 33/9658 |

* cited by examiner

LIGHT ASSEMBLY USING A LIGHT EMITTING DIODE

BACKGROUND OF THE INVENTION

Decorative lighting using light emitting diodes is being used on a more frequent basis for both interior and exterior lighting and for both commercial and personal applications. Light emitting diodes (LEDs) are increasingly being used for various forms of decorative lighting, since these LEDs can present a bright source of illumination, are reliable, and are a long lasting source of light that is inexpensive to make and operate.

SUMMARY OF THE INVENTION

The present invention may therefore comprise a light assembly comprising: a lamp assembly comprising a bulb shell that is transparent that has a rounded shape and a hollow bulb shell interior, the bulb shell being capable of transmitting light from a light emitting diode placed in a hollow bulb shell interior; a lamp assembly extension of the bulb shell that is formed with the bulb shell so that the bulb shell and the lamp assembly extension form a single structure, the lamp assembly extension having a lamp assembly extension hollow interior; a light emitting diode assembly comprising a light emitting diode, two insulated conductors and two light emitting diode wire leads conductively connected to the two insulated conductors; a locking structure formed on an interior wall of the lamp assembly extension hollow interior that holds the light emitting diode assembly in the lamp assembly extension; a heat shrinkable sleeve disposed around the lamp assembly extension and the two insulated conductors when the light emitting diode assembly is inserted into the lamp assembly extension that secures the light emitting diode assembly to the lamp assembly extension and resists water from entering the light assembly.

The present invention may further comprise a method of making a light assembly comprising: forming a lamp assembly as a single structure comprising: forming a hollow bulb shell; forming a lamp assembly extension connected to the hollow bulb shell as a single structure, the lamp assembly extension having a hollow interior that connects to a hollow interior in the hollow bulb shell; forming a light emitting diode assembly comprising: connecting two light emitting diode wire leads to two insulated conductors; placing the light emitting diode assembly into the hollow interior of the lamp assembly extension; placing a heat shrinkable sleeve over the lamp assembly extension and the two insulated conductors when the light emitting diode assembly is placed in the hollow interior of the lamp assembly extension; applying heat to the heat shrinkable sleeve to secure the light emitting diode light assembly in the lamp assembly extension.

DETAILED DESCRIPTION OF THE EMBODIMENTS

Figure 1:
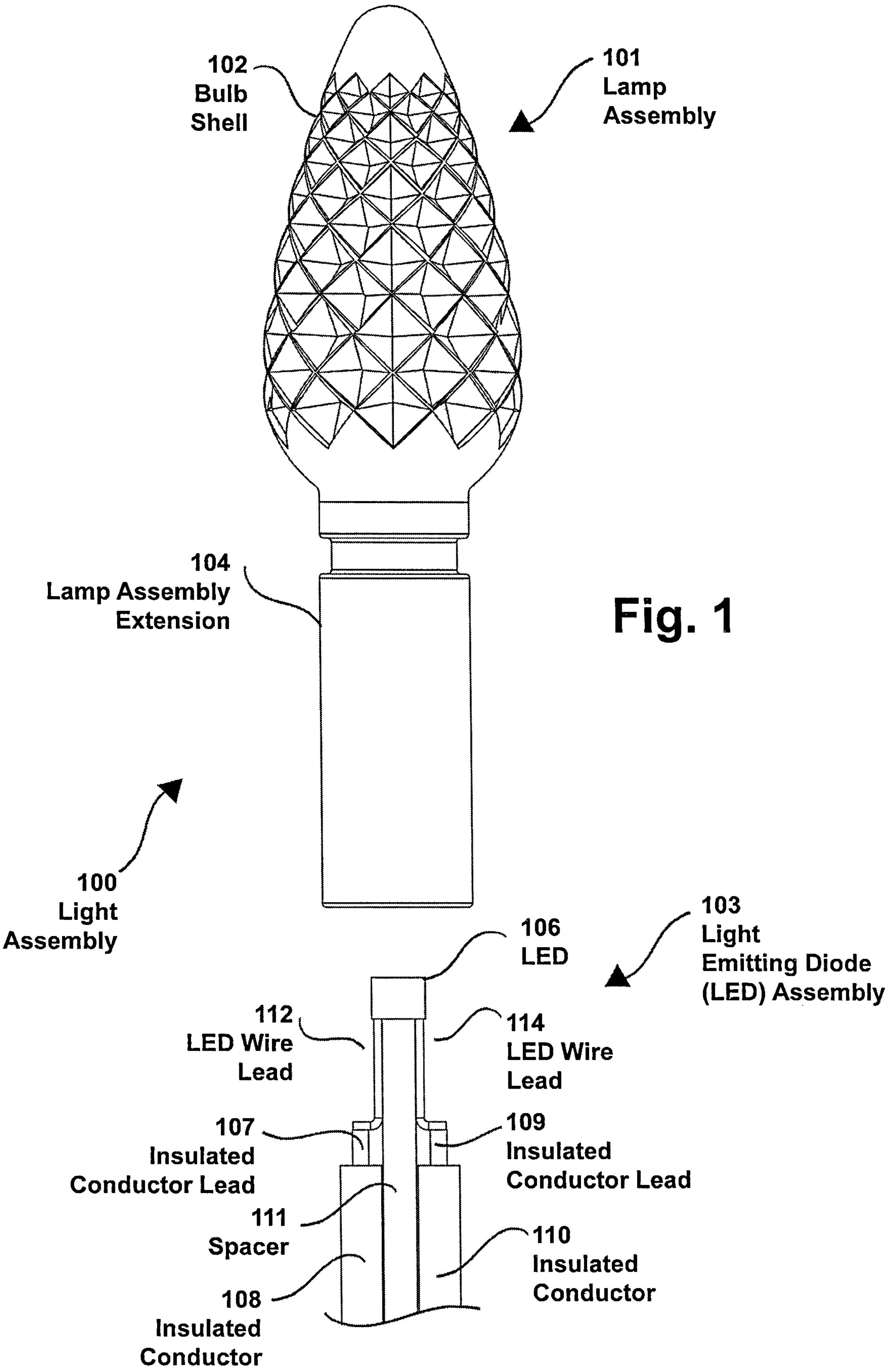
FIG. 1 is an assembly drawing of an embodiment of a lamp assembly and a LED assembly.

FIG. 1 is an assembly diagram of an embodiment of a light assembly 100. The light assembly 100 comprises a lamp assembly 101 and a LED assembly 103. Lamp assembly 101 comprises a bulb shell 102 that is hollow and transmits light. In most instances, the bulb shell 102 is transparent. In some cases, the bulb shell 102 may be colored. The bulb shell 102 may include angular surfaces that are shown or may be smooth. The bulb shell 102 is formed together with the lamp assembly extension 104 to form a unitary structure that comprises the lamp assembly 101. The lamp assembly may be made from a single transparent material so that the lamp assembly extension is also transparent but covered by a heat shrinkable sleeve 116 (FIG. 3). The bulb shell 102 has a hollow interior (hollow bulb shell interior 119, FIG. 4A) and the lamp assembly extension 104 has a generally cylindrical shape with a hollow interior (lamp assembly extension hollow interior 105, FIG. 2). The structure of the lamp assembly 101 can be formed by various molding techniques. The lamp assembly 101 may be made from polypropylene, solid polystyrene, polyethylene, polycarbonate, or polyvinylchloride. The lamp assembly is molded as a single structure. Each of these materials are light transmissive and preferably transparent.

FIG. 1 also shows a LED assembly 103 that is formed and constructed to be inserted into the hollow opening of the lamp assembly extension 104 so that the LED 106 is located within the hollow interior of the bulb shell 102, as shown in FIG. 3. LED 106 has two wire leads, LED wire lead 112 and LED wire lead 114. These wire leads may be spaced apart using a spacer 111. Insulated conductor 108 has an insulated conductor lead 107 that is conductively connected to the LED wire lead 112, while insulated conductor 110 has an insulated conductor lead 109 that is conductively connected to LED wire lead 114. These elements comprise the LED assembly 103 for the light assembly 100.

Figure 2:
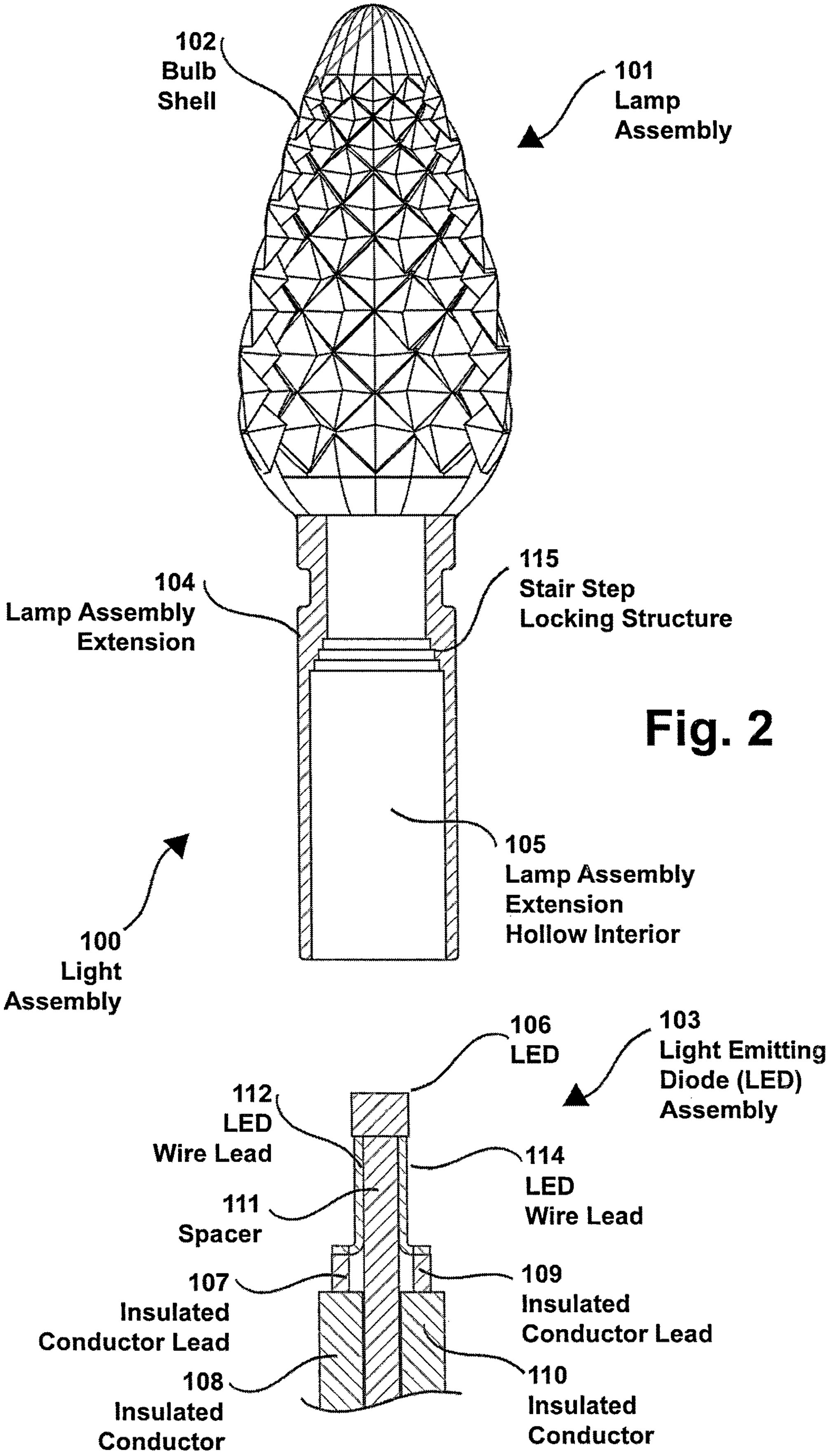
FIG. 2 illustrates the embodiment of FIG. 1 shown with cut-away portions.
Figure 3:
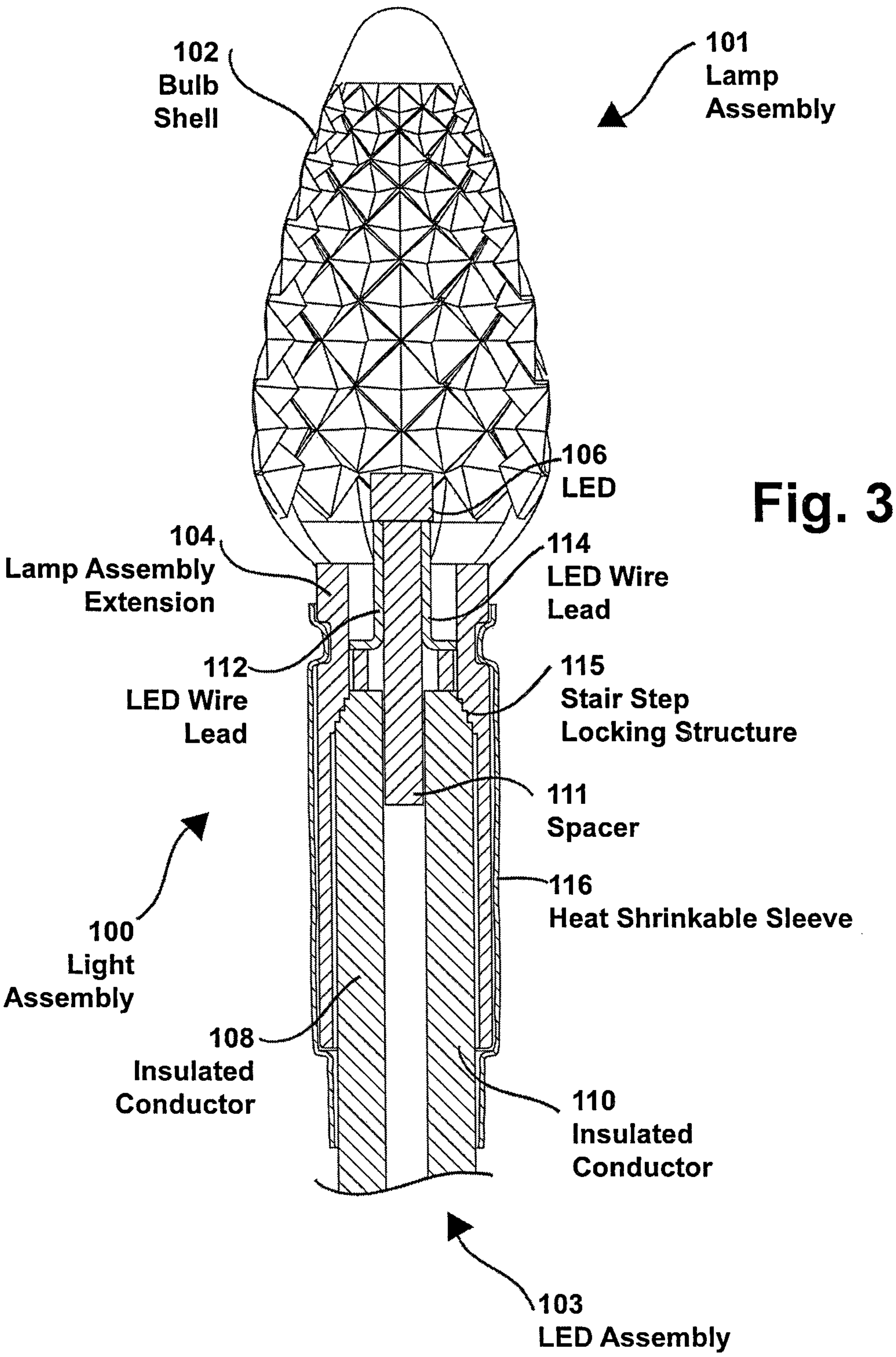
FIG. 3 illustrates the embodiment of FIG. 1 in a close cut-away view of an assembled light assembly.

FIG. 2 is a schematic illustration of the lamp assembly 101 and the light emitting diode (LED) assembly 103. As illustrated in FIG. 2, The light emitting diode (LED) assembly 103 comprises an LED 106, an LED wire lead 112, and an LED wire lead 114. LED wire lead 112 and LED wire lead 114 are separated by a spacer 111 that prevents the LED wire leads from touching. An insulated conductor 108 has an insulated conductor lead 107 that is connected to LED wire lead 112. The conductive connection between the insulated conductor lead 107 and LED wire lead 112 can be made by a solder connection or any other type of conductive connection. Similarly, LED wire lead 114 is conductively connected to insulated conductor lead 108 by any desired conductive connection such as by soldering or through using a conductive bond. The light emitting diode (LED) assembly 103 is sized to fit into the lamp assembly extension hollow interior 105, Insulated conductor 108 and insulated conductor 110 engage a locking structure, such as the stairstep locking structure 115, that is formed on the interior wall of the lamp assembly extension 104. The LED wire leads 112, 114 are separated by the spacer 111 and are connected to insulated conductor lead 107, 109, respectively. The distance between the LED 106 and the insulated conductors 108, 110 is sufficient to cause the LED 106 to be inserted within the bulb shell 102 of a lamp assembly 101 when the insulated conductors 108, 110 engage the stairstep locking structure 115.

FIG. 3 is an illustration of the light assembly 100 in an assembled condition. As illustrated in FIG. 3, the insulated conductor 108 and the insulated conduct 110 engage the stairstep locking structure 115 at a location so that the LED 106 is in the hollow interior portion of the bulb shell 102. The spacer 111 provides a solid structure to hold the LED 106 and the LED wire leads 112, 114 so that the LED 106 can be held firmly in the interior hollow portion of the bulb shell 102. The stairstep locking structure 115 engages the insulated conductors 108, 110 and holds them in a locked position in the lamp assembly extension 104 at the proper height for the LED 106 to be located within the hollow interior of the bulb shell 102. The stairstep locking structure 115 holds the LED assembly 103 in place so that the LED assembly 103 does not move upwardly or downwardly in the lamp assembly extension 104. The lamp assembly extension 104 of the bulb shell 102 is shown partially covered by the heat shrinkable sleeve 116. The heat shrinkable sleeve 116 also extends over the LED assembly 103, and in particular, over a portion of the insulated conductor 108 and insulated conductor 110. When heat is applied to the heat shrinkable sleeve 116, it seals the lamp assembly extension 104 to the insulated conductor 108 and insulated conductor 110, as shown in FIG. 3. In this manner, the lamp assembly 101 is secured to the LED assembly 103 and resists water from entering the opening in the lamp assembly extension 104.

Figure 4A:
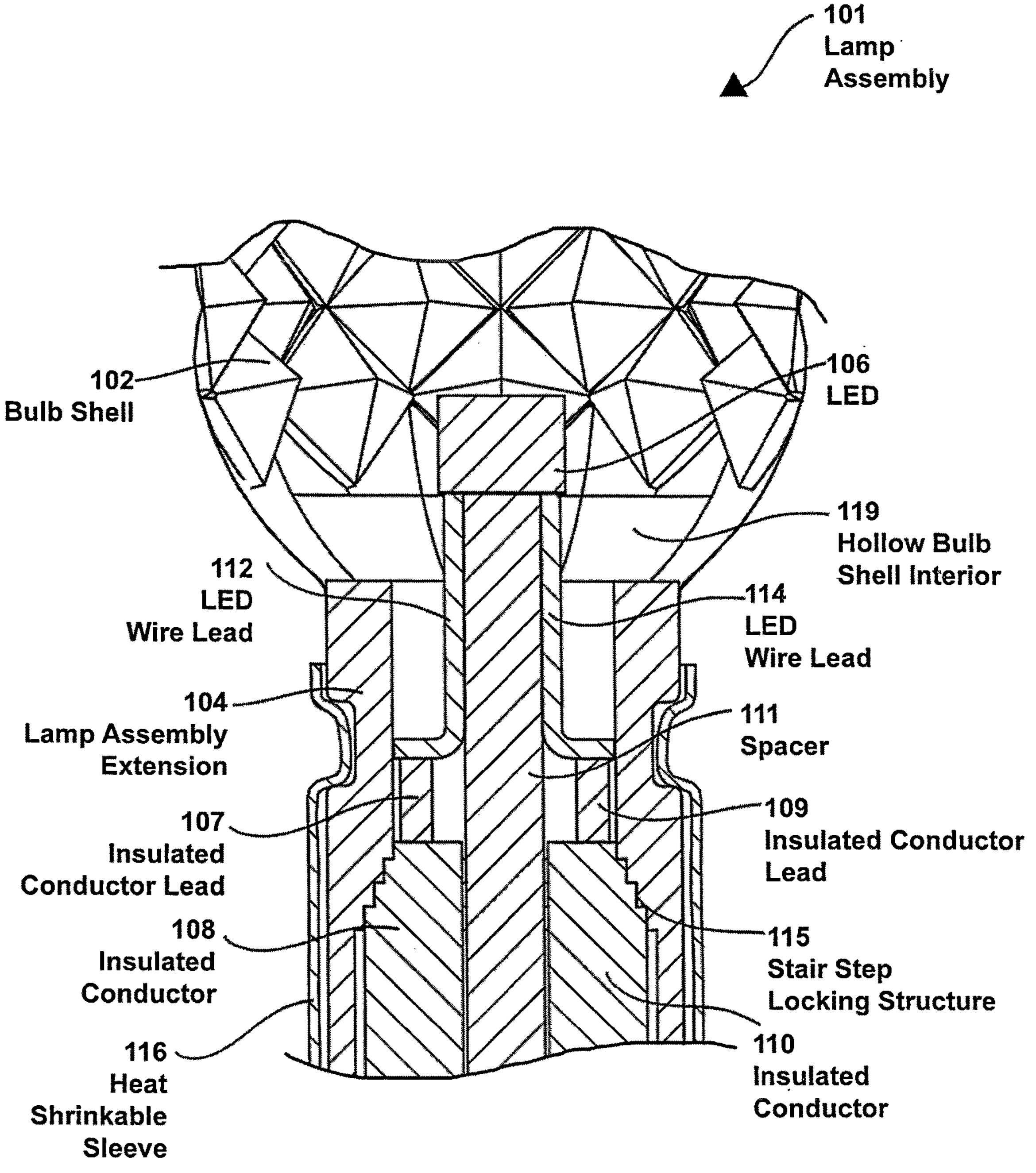
FIG. 4A is a detailed diagram of the embodiment of FIG. 1 showing the lamp assembly with a LED assembly inserted in a lamp assembly extension and a stairstep locking structure.

FIG. 4A is a detailed view of the LED assembly 103 inserted into the lamp assembly 101. As illustrated in FIG. 4A, the LED 106 is inserted within the bulb shell 102 and the hollow bulb shell interior 119. The LED 106 and the LED wire leads 112, 114 are supported by the spacer 111, which provides structural support for the LED 106 and the LED wire leads 112, 114 and separates the LED wire leads 112, 114, since the spacer 111 is made from nonconductive material. LED wire lead 112 is conductively connected to the insulated conductor lead 107, while LED wire lead 114 is conductively connected to the insulated conductor lead 109. The insulated conductor casing 108 and insulated conductor casing 110 are sufficiently soft to engage the stairstep locking structure 115, which holds the insulated conductor 108 and insulated conductor 110 in place in the lamp assembly extension 104.

Figure 4B:
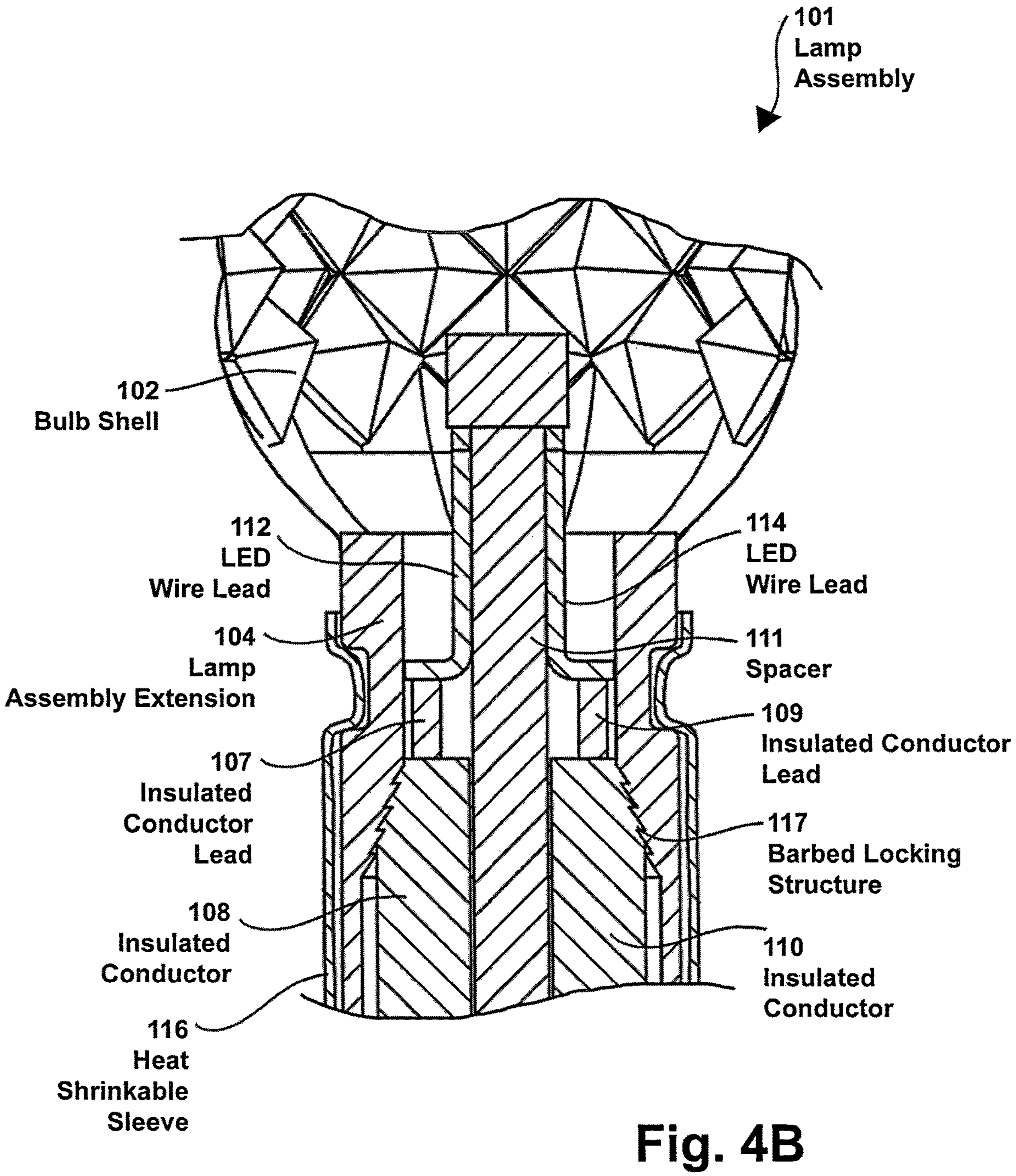
FIG. 4B is a detailed diagram of the embodiment of FIG. 1 showing the lamp assembly with a LED assembly inserted in the lamp assembly extension and a barbed locking structure.

FIG. 4B shows an alternative embodiment of the embodiment of FIG. 4A. As illustrated in FIG. 4B, the lamp assembly extension 104 and bulb shell 102 form a single structure that is molded as a unitary molded structure. LED wire lead 112 is conductively connected to the insulated conductor lead 107. Similarly, the LED wire lead 114 is conductively connected to the insulated conductor lead 109. The heat shrinkable sleeve 116 is heat shrunk over the entire structure to provide structural stability and resist water from entering the lamp assembly 101. Spacer 111 provides structural support for the LED and prevents the LED wire leads 112, 114 from touching. The insulated conductor 108 and insulated conductor 110 are sufficiently soft to engage the barbed locking structure 117, which holds the insulated conductor casings 108, 110 in place so that the LED assembly 103 does not move within the lamp assembly extension 104.

Figure 5:
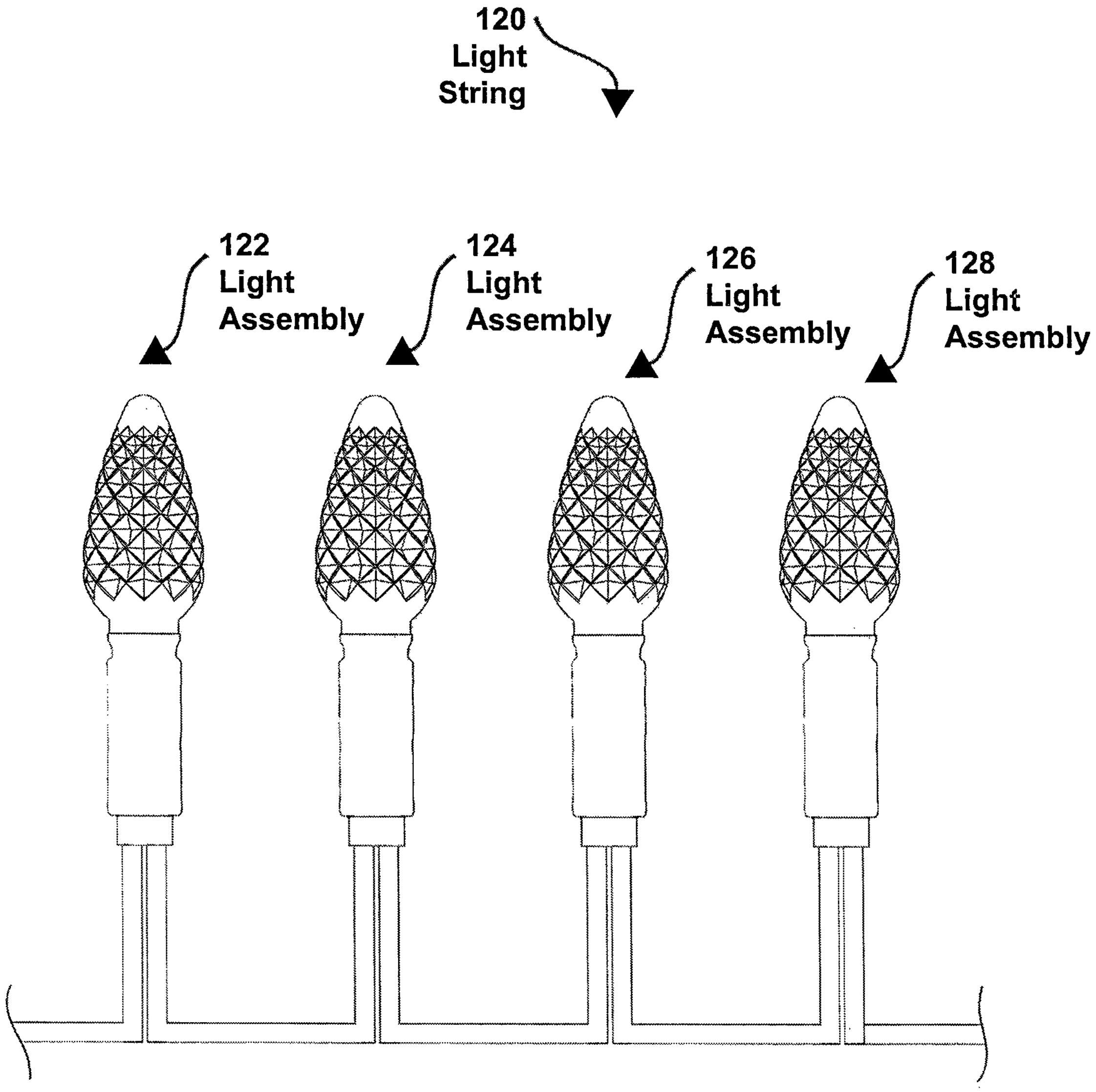
FIG. 5 is a schematic illustration of an embodiment of a light string comprising a light assemblies connected in series.

FIG. 5 is an illustration of a series of lamp assemblies 122-128 that form a light string 120. As illustrated in FIG. 5, lamp assemblies 122, 124, 126, and 128 are connected in series by insulated conductors 130. The use of series connections greatly decreases the cost of insulated wires that are used to connect the lamp assemblies 122-128. Further, the single construction of the bulb shell and lamp extension 104 to form a lamp assembly 101 as a single structure greatly reduces the fabrication cost of the lamp assembly 101 and allows for easy installation of the LED assembly 103 with lamp assembly 101. As such, the embodiment illustrated in FIGS. 1-5 reduces both the fabrication cost as well as the assembly cost and provides a simpler light assembly 100 and light string 120, which is sturdier and more resistant to moisture than prior art devices.

The foregoing description of the invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A light assembly comprising:

a lamp assembly comprising a bulb shell that is transparent that has a rounded shape and a hollow bulb shell interior, said bulb shell being capable of transmitting light from a light emitting diode placed in a hollow bulb shell interior;

a lamp assembly extension of said bulb shell that is molded together with said bulb shell so that said bulb shell and said lamp assembly extension form a single molded structure that is resistant to moisture entering into a hollow interior of said lamp assembly extension and a hollow interior of said bulb shell;

a light emitting diode assembly comprising a light emitting diode, two insulated conductors and two light emitting diode wire leads conductively connected to said two insulated conductors, light emitting diode assembly configured to have a structure that fits through an opening of said lamp assembly extension and an opening in said bulb shell, said light emitting diode assembly having a length that allows said light emitting diode to extend into said hollow interior of said bulb shell;

a locking structure formed on an interior wall of said lamp assembly extension hollow interior having a structure that holds said light emitting diode assembly in said lamp assembly extension and gages by pushing said light emitting diode assembly light into said lamp assembly extension hollow interior;

a heat shrinkable sleeve disposed around said lamp assembly extension and said two insulated conductors when said light emitting diode assembly is inserted into said lamp assembly extension that secures said light emitting diode assembly to said lamp assembly extension and resists water from entering said light assembly.

2. The light assembly of claim 1 further comprising:

an insulated spacer disposed between said diode wire leads configured to prevent contact of said diode wire leads.

3. The light assembly of claim 2 wherein said locking structure comprises a step shaped surface formed in said interior wall of said lamp assembly extension hollow interior.

4. The light assembly of claim 2 wherein said locking structure comprises a barbed shaped surface formed in said interior wall of said lamp assembly extension hollow interior.

5. A method of making a light assembly comprising:
forming a lamp assembly that is molded as a single molded structure comprising:
forming a hollow bulb shell;
forming a lamp assembly extension that is molded to said hollow bulb shell as a single structure, that is resistant to moisture entering into a hollow interior said molded lamp assembly and;
forming a light emitting diode assembly comprising:
connecting two light emitting diode wire leads to two insulated conductors configured with structure that fits into said lamp assembly extension, said light emitting diode assembly having a length that allows said light emitting diode to extend into said the hollow interior of said bulb shell;
pushing said light emitting diode assembly into said hollow interior of said lamp assembly extension so that a locking structure is en red b light emitting diode assembly and said hollow interior of said lamp assembl extension;
placing a heat shrinkable sleeve over said lamp assembly extension and said two insulated conductors after said light emitting diode assembly is placed in said hollow interior of said lamp assembly extension;
applying heat to said heat shrinkable sleeve to secure said light emitting diode light assembly in said lamp assembly extension.

6. The method of claim 5 further comprising:
forming said locking structure on said hollow interior of said lamp assembly extension that is constructed to have a step shaped surface.

7. The method of claim 5 further comprising:
forming said locking structure on said hollow interior of said lamp assembly extension that is constructed to have a spike shaped surface.

8. The method of claim 5 further comprising:
placing an insulated spacer between said diode wire leads.

9. The method of claim 6 further comprising:
placing an insulated spacer between said diode wire leads.

10. The method of claim 7 further comprising:
placing an insulated spacer between said diode wire leads.

* * * * *